April 7, 1931.     P. C. PAULS     1,799,831
ADJUSTABLE SPRINGBOARD FOR DOUGH TROUGHS
Filed May 22, 1929
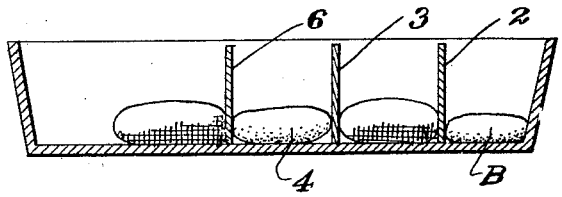
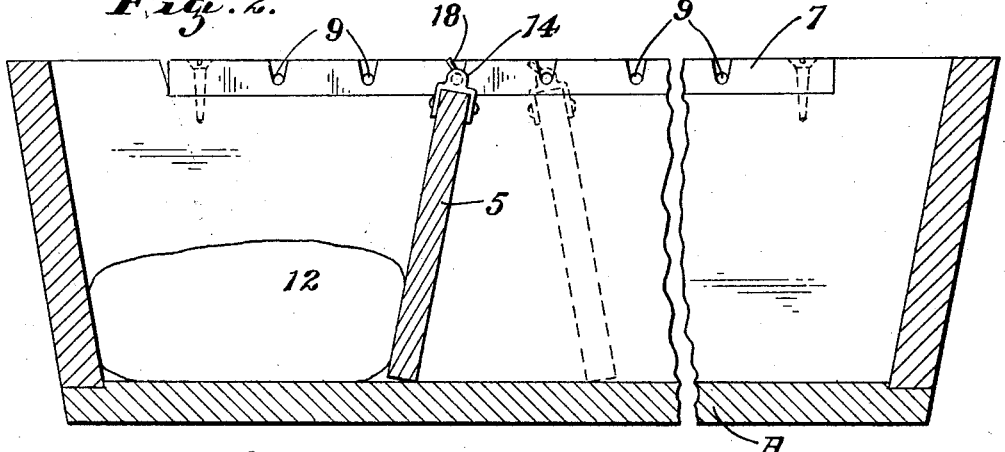
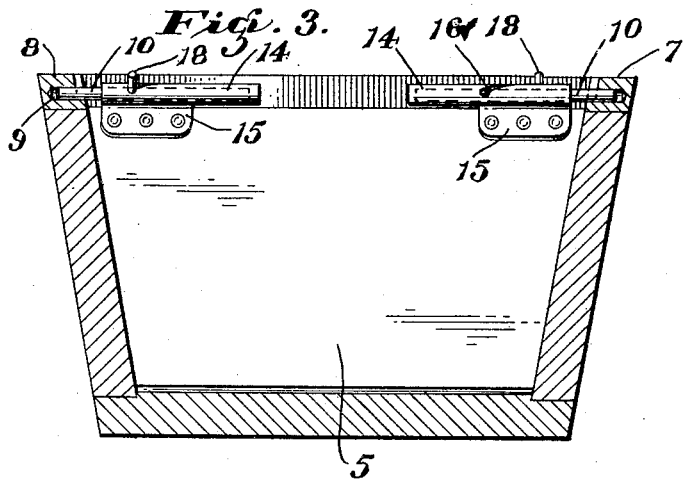
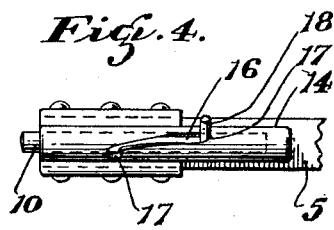
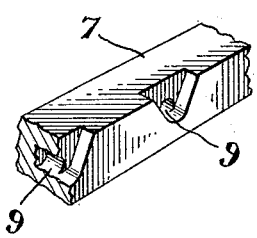
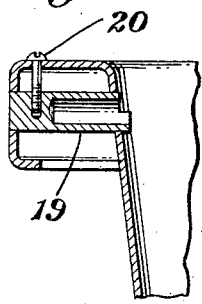
INVENTOR.
Peter C. Pauls.
BY Townsend, Loftus & Abbett
ATTORNEYS.

Patented Apr. 7, 1931

1,799,831

UNITED STATES PATENT OFFICE

PETER C. PAULS, OF PALO ALTO, CALIFORNIA

ADJUSTABLE SPRINGBOARD FOR DOUGH TROUGHS

Application filed May 22, 1929. Serial No. 365,147.

This invention relates to a dough trough such as used by bread bakers, and especially to a spring board or partition member which is adjustable longitudinally of a trough so as to divide the trough into two or more separate compartments to receive and retain different batches of dough during the process of rising.

The object of the present invention is to generally improve and simplify the construction and operation of spring boards of the character described; to provide a spring board which may be readily fitted and attached to a standard dough trough; to provide means whereby one or more spring boards may be inserted and adjusted longitudinally of the trough to divide the trough into separate compartments; to provide a sliding bolt mechanism whereby one or more spring boards may be quickly inserted in a trough and secured, which is quickly removable when the trough is to be cleaned; and further to provide a spring board which is sanitary and easy to clean.

The invention is shown by way of illustration in the accompanying drawings, in which:

Fig. 1 is a diagrammatic view of an ordinary dough trough,

Fig. 2 is a longitudinal section of a trough, showing the spring board inserted and secured in position, Fig. 3 is a cross section of the trough showing the spring board in position, Fig. 4 is a plan view of one end of the spring board showing the bolt locking mechanism, Fig. 5 is a perspective view of one of the bars whereby the spring board is supported, Fig. 6 shows a modified construction of a trough.

In baking shops it often happens that the dough trough is sixteen feet or more in length. If it is desired to mix up several different small batches of dough it is necessary to place several partition members throughout the length of the trough to keep the different batches of dough separated. The dough is in some instances mixed directly in the trough, but in larger shops the mixing operation is taken care of by large mixers and the dough is then placed in the trough and is retained there while fermentation or the process of rising takes place.

If a small batch of dough, such as indicated at B is placed in the trough, it is necessary to insert a partition board such as indicated at 2—this board usually being supported by placing a sack of flour or whatever is handy behind it, so as to hold it upright against the dough while the dough is rising.

It may here be stated that while the dough is rising it should be kept in as compact a mass as possible, so that as small a portion of the dough as possible will be exposed to a chilling atmosphere or air currents, as these will tend to cause the dough to fall. It is therefore necessary to confine the dough to as small a place as possible, just giving sufficient room to rise. When one batch of dough has been placed in the trough, and if another batch is to be placed therein, it is necessary to insert a second partition member, as indicated at 3. The second batch of dough is placed in the trough, as indicated at 4, and a third partition member is then placed on the other side, as indicated at 6, and this must again be supported by another sack of whatever may be handy.

The intermediate space shown at 2 is, of course, lost and it may fourthermore be stated that the method of propping up the partition boards is anything but sanitary, as flour sacks, salt sacks, barrels etc., which are not always too clean, are used for that purpose.

In the present instance a partition board or what is commonly known in the baking trade as a spring board, has been provided, which does not require any propping up whatsoever. The spring board is best illustrated in Figs. 2 and 3. In these figures A indicates the trough, and 5 the spring board. The opposite edges of the trough are provided with a metal strip or the like, as indicated at 7 and 8, and these strips are recessed, as shown at 9, to receive the outer ends of bolts 10 which are carried by the spring board proper. If a small batch of dough is mixed up and is placed in the trough at the point indicated at 12, the spring board is inserted, as shown in Fig. 2, and it is held in place by the bolts 10. The pressure of the dough as it rises and expands tends to hold the board in position as it normally assumes a slightly inclined position. A second batch of dough may be placed on the other side of the spring board, and if more batches are desired any number of spring boards can be inserted, as the metal strips 7 and 8 extend substantially from end to end of the trough.

The bolts 10 are slidably mounted in tubular shaped casings 14, which are secured to the upper edge of the spring board by means of downturned perforated flanges 15, which engage opposite sides of the board, the castings being secured by the insertion of screws or the like. The upper surfaces of the tubular castings are provided with inclined slots 16, which terminate in hook-shaped recesses 17 at opposite ends. Each bolt is provided with a projecting pin 18, and these pins are grasped and moved in an outward direction when the bolts 10 are to be projected into the recesses 9 of the metallic strips, or pulled in an inward direction when the bolts are to be retracted and the spring boards removed.

In some bakeries metal troughs are employed, as shown in Fig. 6, and if it is desired to use a spring board such as here shown the upper flange and the upper edge of the trough is drilled and bushings, such as indicated at 19, are inserted and secured by means of screws 20. Any number of bushings may be placed on each side of the trough, and several spring boards may thus be inserted throughout the length of the trough or as conditions may demand.

The spring board shown in the present instance may be applied either to wooden or metallic troughs, it being understood that the spring boards are fitted so as to snugly engage the bottom and sides of the trough. The spring boards may be quickly removed or inserted whenever required, and they may be adjusted longitudinally of the trough. A number of spring boards may be inserted at the same time, and sanitation is insured, first because propping up devices such as sacks, barrels etc., are entirely eliminated, and secondly because no pockets or recesses are provided on the spring board here illustrated, in which dough or foreign matter may accumulate.

While certain features of the present invention are more or less specifically described, I wish it understood that various changes may be resorted to within the scope of the appended claim, similarly, that the materials and finishes of the several parts employed may be such as the manufacturer may decide, or varying conditions or uses may demand.

Having thus described my invention, what I claim and desire to secure by Letters Patent is:

An adjustable spring board for dough troughs comprising a board adapted to extend crosswise of the trough, spaced castings on the upper edge of the board, downwardly extending flanges carried by said castings to embrace the sides of the board, a reciprocable bolt carried by each of said castings, bars secured to opposite sides of the trough, said bars having holes formed therein, and means for projecting said bolts into said holes, said bars also having a V-shaped recess formed therein adjacent each hole to facilitate the insertion of the bolts into the holes.

PETER C. PAULS.